Figure 5:
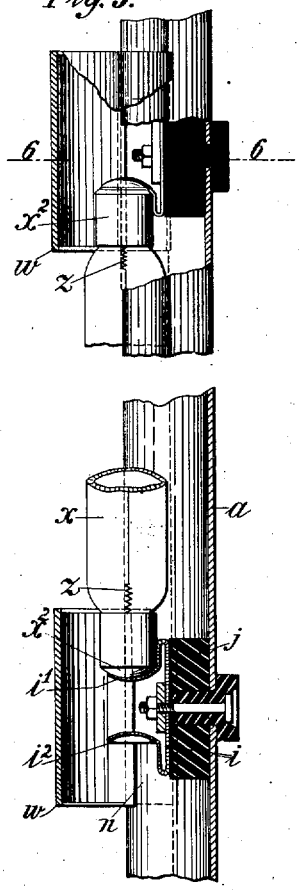

No. 12,795. REISSUED MAY 26, 1908.
A. W. BEUTTELL.
ILLUMINATING DEVICE.
APPLICATION FILED MAR. 25, 1908.
2 SHEETS—SHEET 1.
Fig. 1.
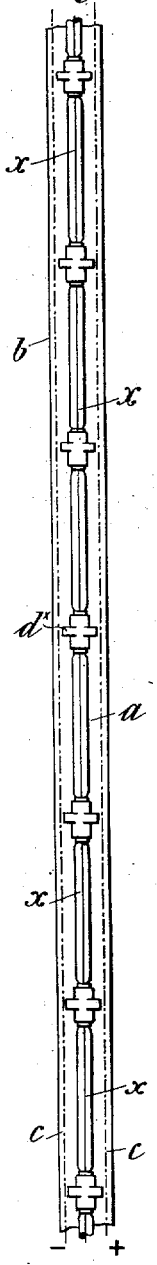
Fig. 2.
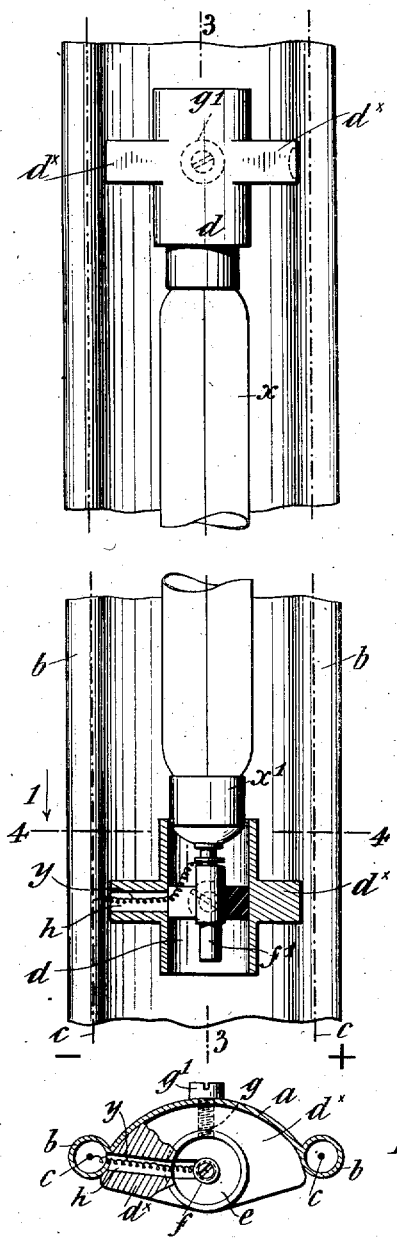
Fig. 3.
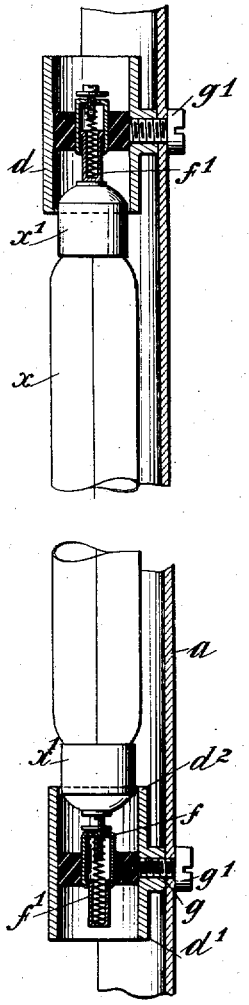
Fig. 4.
Witnesses
Jose J. Amon
Aurelius Bicha
Inventor
Alfred W. Beuttell
By his Attorneys
Kidder Wendell & Harvey No. 12,795. REISSUED MAY 26, 1908.

A. W. BEUTTELL.

ILLUMINATING DEVICE.

APPLICATION FILED MAR. 25, 1908.

2 SHEETS—SHEET 2.

Witnesses
Jos. J. Amon
Aurelius F. Scha

Inventor
Alfred W. Beuttell
By his Attorneys
Rider Wendell & Barney

UNITED STATES PATENT OFFICE.

ALFRED WILLIAM BEUTTELL, OF NEW YORK, N. Y.

ILLUMINATING DEVICE.

No. 12,795. Specification of Reissued Letters Patent. Reissued May 26, 1908.

Original No. 831,821, dated September 25, 1906, Serial No. 127,653. Application for reissue filed March 25, 1908. Serial No. 423,278.

*To all whom it may concern:*

Be it known that I, ALFRED WILLIAM BEUTTELL, a subject of the King of Great Britain, residing in the borough of Manhattan, of the city of New York, in the county and State of New York, have invented certain new and useful Improvements in Illuminating Devices, of which the following is a specification, reference being had to the accompanying drawings, forming a part hereof.

This invention relates to mountings and fittings for incandescent electric lamps; and it consists of a mounting or fitting of novel character for incandescent electric lamps of the character hereinafter defined as "double-ended" lamps and is designed to produce simple and novel means to very effectively and strikingly illuminate shop-windows or for outlining buildings or for illuminations or other analogous purposes.

According to my present invention I employ double-ended incandescent electric lamps advantageously of cylindrical or other form capped at both ends and advantageously having a single filament right through from end to end, and I arrange such lamps in a continuous line end to end (or, if desired, more than one line of such lamps may be employed) in or upon a continuous reflector, which latter in cross-section may advantageously be of semicircular form or may be of V or U shape in cross-section or other suitable form—for instance, trough-shaped—the lamps being located within or partly within the depression of said reflector, so as to be surrounded or partly surrounded thereby, and for the sake of example I will describe my invention as carried out with a reflector of semicircular form. Along each longitudinal edge of this reflector I provide a tube which may advantageously be formed integral with said reflector by drawing or rolling process, such tube along each edge serving to hold one of the conductors and the exterior of said tube or tubular bead on each edge or so much of it as shows being also formed as part of the reflector. This reflector is provided with novel bridge pieces or supports, as hereinafter fully described, for the lamps spaced apart at suitable distances, each said bridge-piece carrying a double socket or being a double holder and adapted to hold the end of each of two lamps and adapted to connect one end of each of two lamps to one pole of the electric circuit—*i. e.*, adapted to supply current to the end of a lamp on each side of said bridge-piece—such sockets or holders being so located as to be adapted to hold said lamps in line with the channel or depression in the reflector; and in order that the invention may be easily understood and readily carried into practice I will proceed to fully describe same with reference to the drawings hereunto annexed.

Figure 6:
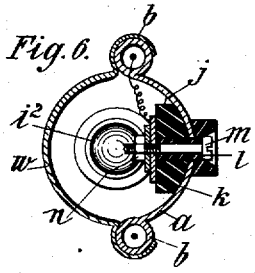
Figure 7:
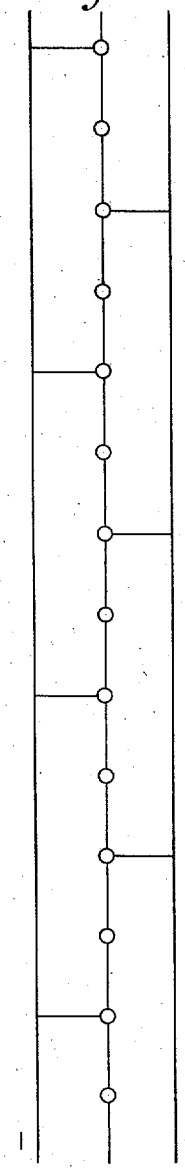
Figure 8:
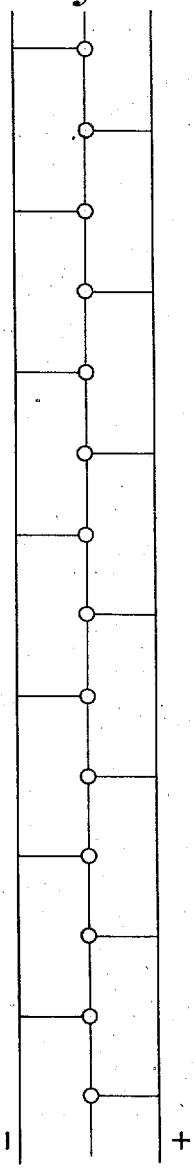

Referring to the drawings, Figure 1 is a view in elevation of the device or appliance according to my present invention. Fig. 2 is a local plan view, on an enlarged scale, partly in section, showing details of construction. Fig. 3 is a longitudinal sectional view on line 3—3, Fig. 2. Fig. 4 is a cross-sectional view on line 4—4, Fig. 2, looking in the direction of the arrow 1. Fig. 5 is a similar view to Fig. 3, showing certain modifications hereinafter described. Fig. 6 is a cross-sectional view on line 6—6, Fig. 5. Fig. 7 is a diagrammatic view showing the lamps connected up two in series and all the groups of two in parallel. Fig. 8 is a diagrammatic view showing the lamps all connected up in parallel.

Referring to Figs. 1 to 4, *a* is reflector of semi-circular form in cross-section, with each longitudinal edge thereof formed as a tube or tubular bead *b*, each such tubular bead *b* being adapted to have located therein the conductors *c*. The inside surface of this reflector *a* is formed as a reflector or reflecting surface in any suitable manner—for instance same may be plated, japanned, polished, &c. The length of this reflector depends on the length or extent of surface to be illuminated, and spaced apart (advantageously at equi-distance) throughout the length of said reflector are bridge-pieces or supports for holding the lamps, each bridge-piece or support consisting of a short length of tube *d*, located centrally in the reflector *a* and parallel with the latter, each end of said tubular bead *d* forming a tubular socket adapted to receive one end of a lamp therein. Within this short tube *d* is located a split insulating-washer *e*, adapted to grip and hold therein a spring-buffer or "spring-plunger" *f*—such, for instance, as the well-known type of plunger employed in the holder for receiving the ordinary bayonet-cap lamp—one of the two telescoping contact members *f* of said plunger being gripped and firmly held in said washer $e$ by screwing up the screw $g$ by means of the head $g'$ thereon from and through the back of the reflector, as hereinafter described, and thereby the plunger is held insulated from the reflector $a$ and tubular socket $d$, &c. The connection $y$ from the conductor $c$ is connected to one end of said plunger—for instance, by means of the ordinary screw and washer as shown in Fig. 2—and the movable part $f'$ of said plunger being thus located centrally in one end $d'$ of the tubular socket $d$ and adapted to make contact with the end of the lamp inserted in said socket, while the end of the lamp inserted in the other end $d^2$ of said socket will also make contact with the other end of said plunger, thus connecting one end of each of two separate lamps through one bridge-piece or support to one pole of the electric circuit. The socket $d$ has fixed, formed, or mounted therein the semi-circular boss or web $d^\times$, this latter being advantageously cast integrally with said socket or tubular piece $d$, the outside formation of said boss or web $d^\times$ being approximately of the same shape as the inner contour of the reflector, so as to bed or fit snugly therein, and is secured thereto by passing the screw $g$ from the outside of the reflector $a$ through the said web or boss $d^\times$ and tube $d$ into or against the insulating split washer $e$, which latter is thereby firmly pressed onto the barrel $f$ of the plunger, and the whole of these parts are thus firmly locked in position. The passage $h$ may be drilled or otherwise formed through the web $d^\times$, as shown in Fig. 2, to enable the connecting-wire $y$ to be passed through from the conductor (through a hole in the hollow bead) to the aforesaid plunger.

In carrying out this invention I advantageously employ straight tubular lamps—*i. e.*, with straight cylindrically-shaped glass—with one (or more) filament passing through said lamp from end to end, either straight through or otherwise, as desired, but in all cases with the electrical connection to one end of said filament (or each filament, if more than one) located at one end of the lamp and the electrical connection to the other end of said filament located at the other end of said lamp, and this character of lamp for the sake of brevity I have termed and shall herein refer to as a "double-ended" lamp, and furthermore, in carrying out my invention where it is desired to have the line of light not only continuous throughout the length of the reflector $a$ but also as straight as possible in each individual lamp mounted in said reflector $a$, therefore to facilitate or attain this object I may employ a spring or springs in each lamp arranged to act upon or in conjunction with the carbon filament in such wise as to tend to keep said filament in a straight line or as near a straight line as possible during incandescence—for instance, a spring connection such as shown at $z$ in Fig. 5—and, furthermore, I am enabled by my invention to maintain the filament of each lamp and every part throughout the length thereof constantly in focus of the reflector, or approximately so.

$x$ $x$ are the double-ended lamps as and for the purposes hereinbefore set forth. It will thus readily be seen that any double-ended lamp $x$ can be placed in position in or removed from the reflector by placing one end of same in the socket against the movable part $f'$ of the plunger and forcing the said movable part $f'$ into its barrel $f$ until the other end of the double-ended lamp can pass into (or in the case of removing pass out of) the socket opposite thereto in the next adjacent bridge-piece.

In Figs. 5 and 6 I have illustrated a modified arrangement of socket or holder in which to mount the double-ended lamps $x$, as follows: The two spring contact-pieces $i'$ $i^2$, carried on the plate $i$, which is firmly attached to the reflector $a$ and insulated therefrom in any suitable manner—as, for instance, by the means shown in the drawings—consisting of a block of insulating material $j$, adapted to fit the inside of the reflector $a$, and through which passes a barrel or bush $l$ of insulating material to the exterior of the reflector $a$, and through this barrel $l$ and also through the plate $i$ is passed a screw or bolt $m$ with nut and washer $n$ screwed on the inside end thereof, and thereby the said plate $i$ and spring contact-pieces $i'$ $i^2$ are firmly held in position. Electrical connection is made from the conductor in one of the beads $d$ to said plate $i$ and spring contact-pieces $i'$ $i^2$, so that when the end of a lamp has been placed in position and clipped and held by the contact-piece $i'$ and the end of another lamp held in the spring contact-piece $i^2$, thereby each double support or double holder will connect one end of each of these two lamps to one pole of the electric circuit and similarly with the other double supports or double holders throughout the length of said reflector.

In the construction illustrated in Figs. 5 and 6 any suitable removable cover or shield may be employed, if desired, over the bridge-pieces $i$ $i'$ $i^2$. For instance, an arched plate, such as $w$, may be clipped on the bead $b$ or be otherwise suitably secured and may advantageously be insulated on the inside thereof.

In the arrangement shown in Fig. 2 the lamps would have their contacts only centrally located in each end of the lamps and insulated from the outer collar $x'$, whereas in the arrangement illustrated in Figs. 5 and 6 the whole of the end or cap $x^2$ (at each end of the lamp) may be adapted to form contact—*i. e.* alive.

It is to be clearly understood that I do not wish to confine myself to the precise construction of bridge-pieces and double holders or double sockets as illustrated, as I may obviously employ other equivalent constructions in carrying out my present invention.

I claim as my invention:—

1. In an illuminating device, the combination of a concave trough-shaped reflector having an integral bead extending along each side edge, electric lamps supported on said reflector, and conducting-wires housed within said beads of the reflector and connected to said lamps.

2. In an illuminating device, a support for double-ended incandescent lamps, comprising two contact members in close proximity to each other and having oppositely-disposed contact-surfaces to contact with different lamps, one of said members being slidable with respect to the other, and means tending to separate said members.

3. In an illuminating device, a support for double-ended incandescent lamps, embodying telescoping contact members, and a spring inclosed by and tending to separate said members.

4. In an illuminating device, a support for double-ended incandescent lamps, comprising a tube-section, an insulating-washer held in said section, and a plunger embodying a barrel fixedly mounted in said washer, a movable part slidable in said barrel and said movable part, the barrel and movable part of said plunger being provided with oppositely-disposed contact surfaces.

5. An illuminating device comprising a reflector, a plurality of supports arranged along the reflector, and double ended incandescent lamps mounted in said supports, one support being common to two lamps and having a fixed contact for one of the lamps and a yielding contact for the other lamp.

6. In an illuminating device the combination of a plurality of double ended lamps arranged in line and a common support between each two adjacent lamps, said support having a fixed abutment for one lamp and a yielding abutment for the other lamp.

7. In an illuminating device, the combination of a plurality of double ended lamps arranged in line and supports therefor, one such support being arranged between each two adjacent lamps, and the two supports at the ends of each lamp presenting the one a fixed abutment for the lamp and the other a yielding abutment, whereby the lamps may be held yieldingly in a fixed position.

8. In an illuminating device, the combination of a plurality of double ended lamps arranged in line and a common tubular support between each two adjacent lamps, said support having a fixed abutment for one lamp within the tubular portion and a yielding abutment for the other lamp also within the tubular portion.

9. In an illuminating device, the combination of a plurality of double ended lamps arranged in line, means for positively holding each lamp at one end, and means for yieldingly holding said lamp at the other end.

10. In an illuminating device, the combination of a plurality of double ended lamps arranged in line, means for positively holding each lamp at one end, means for yieldingly holding the said lamp at the other end, conductors to said lamps leading from a source of electrical supply, and means to conceal said conductors from view.

11. In an illuminating device, the combination of a plurality of double ended lamps arranged in line, a common support between each two adjacent lamps, said support having a fixed abutment for one lamp and a yielding abutment for the other lamp, conductors to said lamps leading from a source of electrical supply, and means to conceal said conductors from view.

12. In an illuminating device, the combination with a double-ended incandescent lamp having at each end a terminal cap embodying an electrode, of a support for each end of the lamp having a tubular socket adapted to receive therein one of the said caps, a yielding contact in one of the tubular sockets, and a fixed contact in the other socket, said contacts being adapted to make electrical connection with the respective electrodes in the ends of the lamp.

This specification signed and witnessed this 5th day of March, A. D., 1908.

ALFRED WILLIAM BEUTTELL.

Signed in the presence of—
JOHN PELLS,
WALTER H. KAY.